No. 664,930. Patented Jan. 1, 1901.
T. C. DEXTER.
PAPER REGISTERING INSTRUMENT.
(Application filed Apr. 6, 1900.)
(No Model.) 5 Sheets—Sheet 1.

WITNESSES: H. B. Smith, J. J. Laass

INVENTOR Talbot C. Dexter
By E. Laass
ATTORNEY

No. 664,930. Patented Jan. 1, 1901.
T. C. DEXTER.
PAPER REGISTERING INSTRUMENT.
(Application filed Apr. 6, 1900.)
(No Model.) 5 Sheets—Sheet 2.

WITNESSES:
H. B. Smith
J. J. Laass

INVENTOR
Talbot C. Dexter
By E. Laass
ATTORNEY

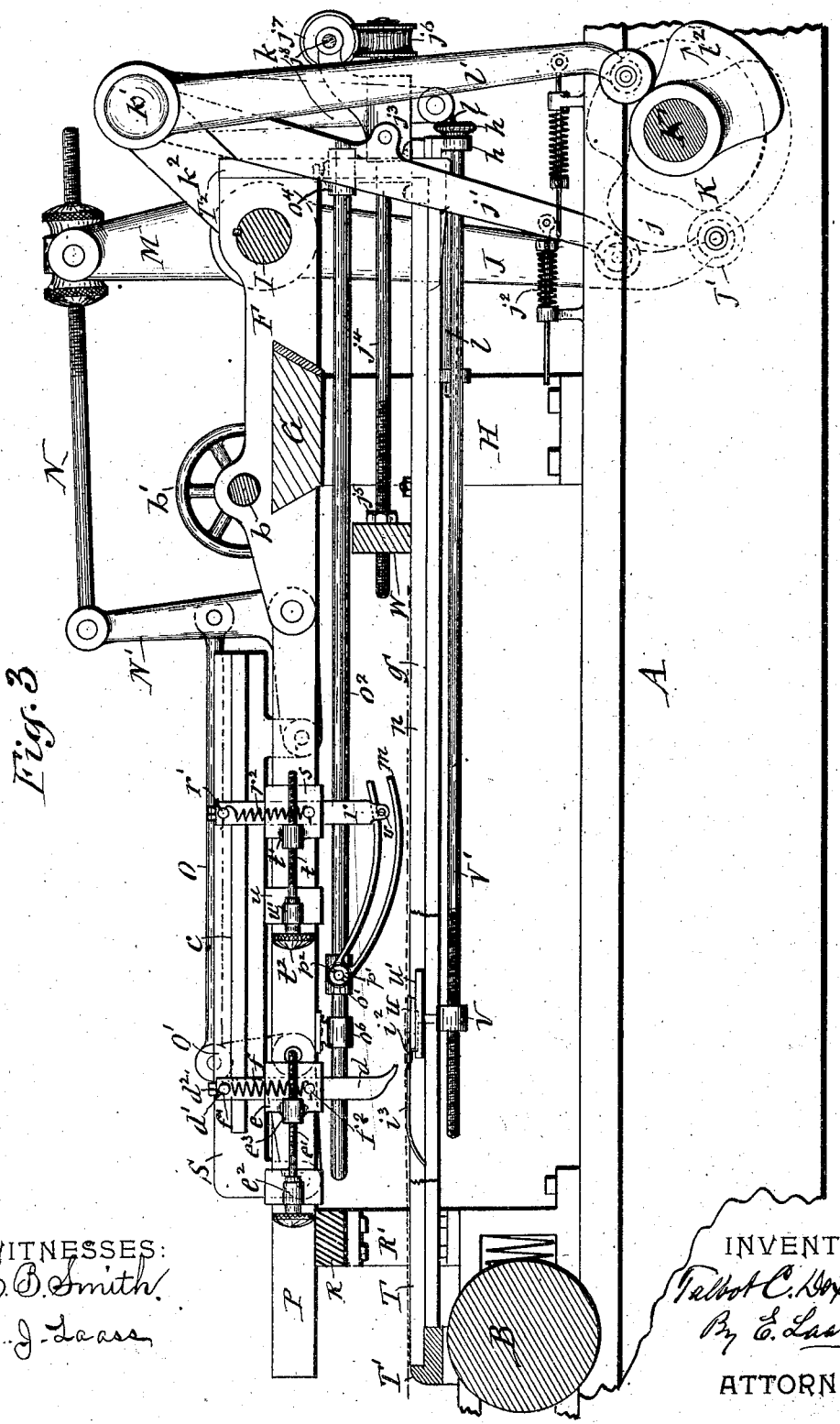

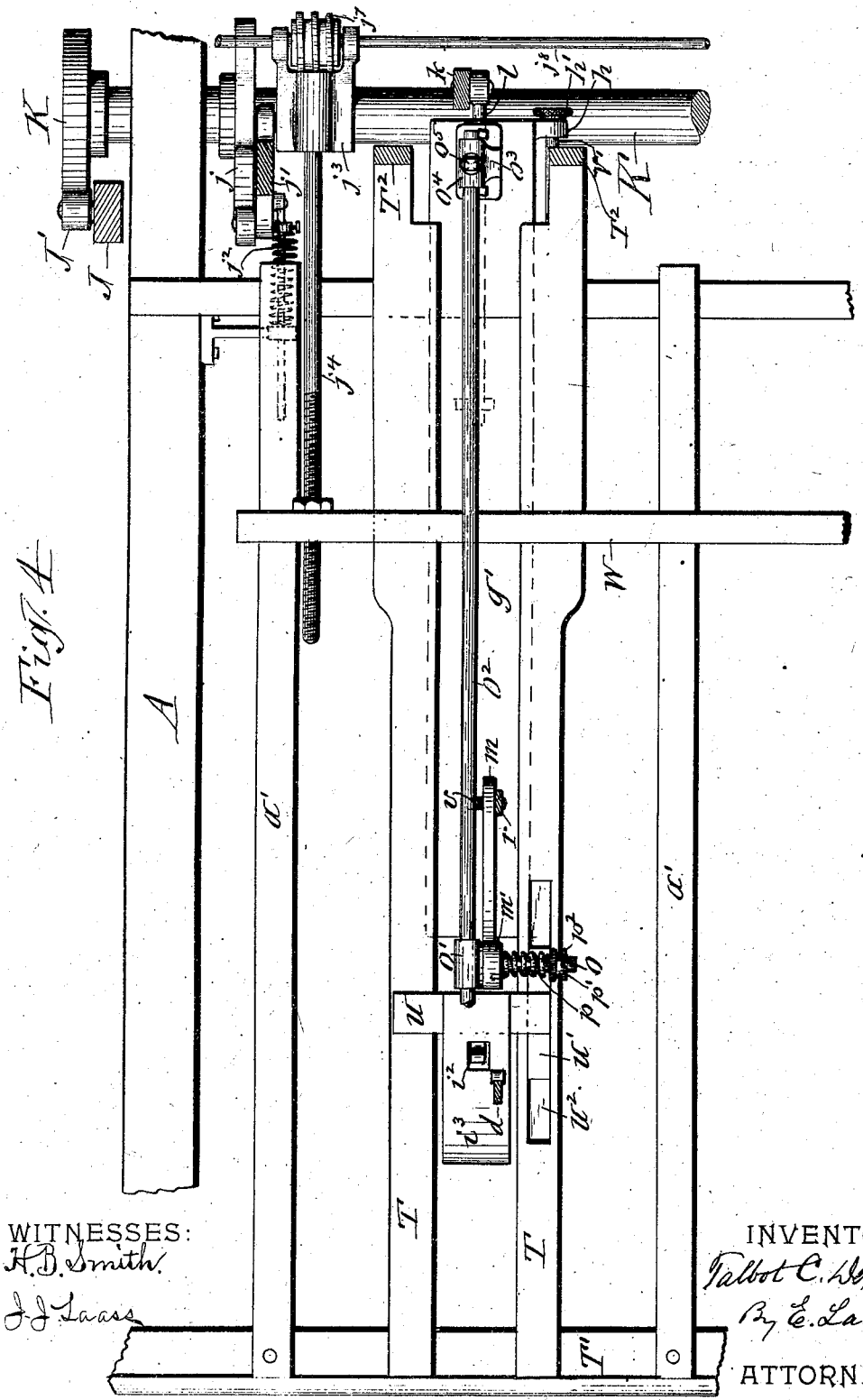

No. 664,930. Patented Jan. 1, 1901.
T. C. DEXTER.
PAPER REGISTERING INSTRUMENT.
(Application filed Apr. 6, 1900.)
(No Model.) 5 Sheets—Sheet 5.

WITNESSES:
H. B. Smith
J. J. Laass

INVENTOR
Talbot C. Dexter
By E. Laass
ATTORNEY

UNITED STATES PATENT OFFICE.

TALBOT C. DEXTER, OF PEARL RIVER, NEW YORK, ASSIGNOR TO THE DEXTER FOLDER COMPANY, OF SAME PLACE.

PAPER-REGISTERING INSTRUMENT.

SPECIFICATION forming part of Letters Patent No. 664,930, dated January 1, 1901.

Application filed April 6, 1900. Serial No. 11,890. (No model.)

*To all whom it may concern:*

Be it known that I, TALBOT C. DEXTER, a citizen of the United States, and a resident of Pearl River, in the county of Rockland, in the State of New York, have invented new and useful Improvements in Paper-Registering Instruments, of which the following, taken in connection with the accompanying drawings, is a full, clear, and exact description.

This invention relates to the class of paper-registering instruments which are equipped with a point or tongue entering or engaging a slit or opening made in the paper for registering it thereby.

The invention consists, chiefly, in improved means for shifting the paper or imparting to it the secondary advance movement required to carry the slitted or perforated portion of the paper into engagement with the registering point or tongue; and the invention also consists in novel features of the details of construction, all as hereinafter more fully described, and pointed out in the claims.

Figure 1:
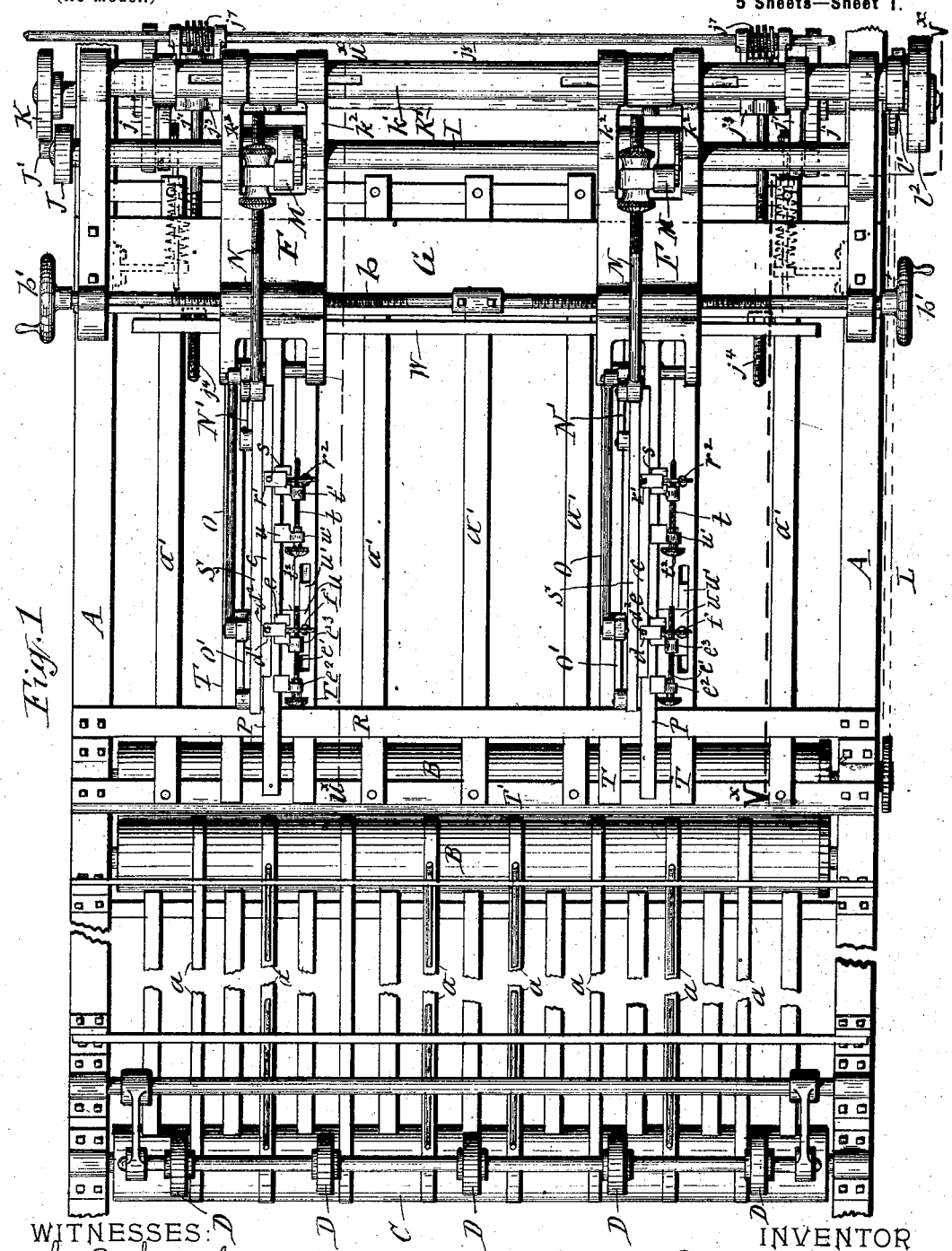
Figure 2:
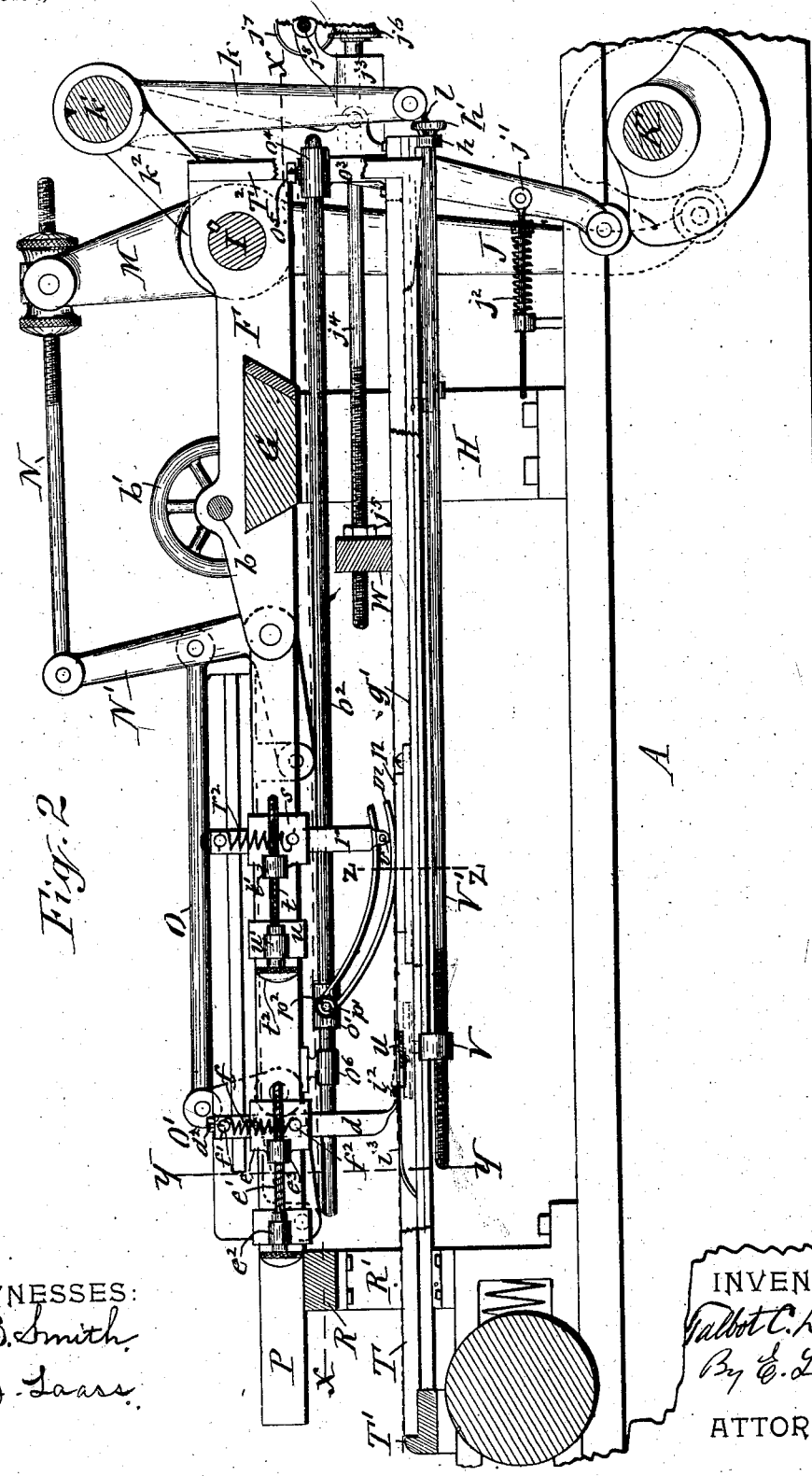
Figure 6:
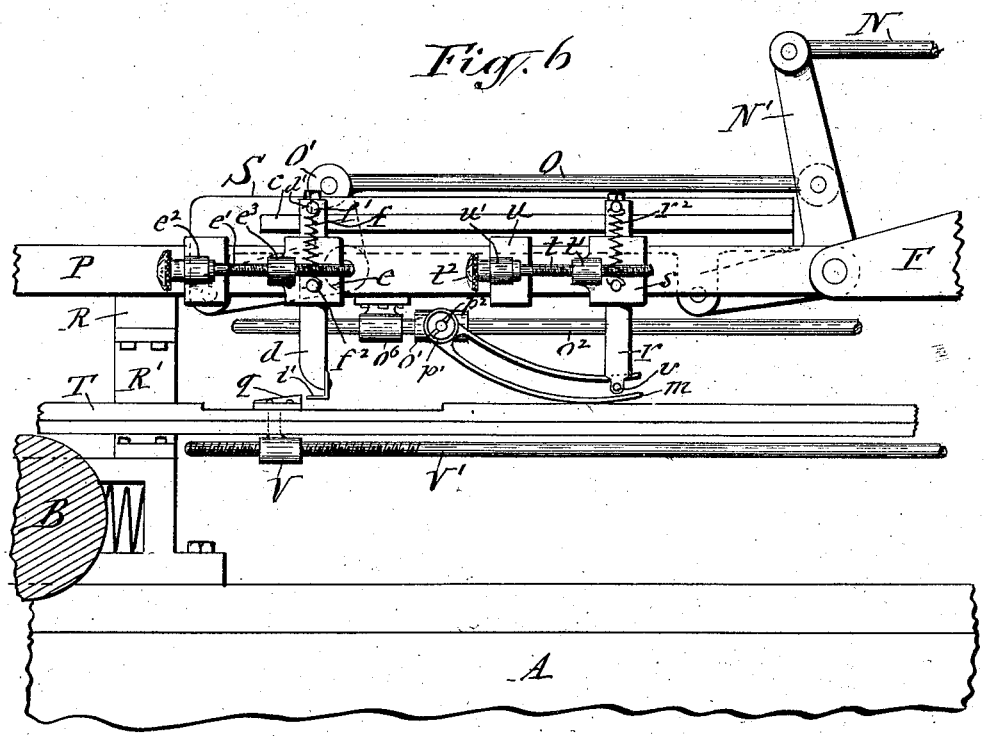
Figures 5, 7:
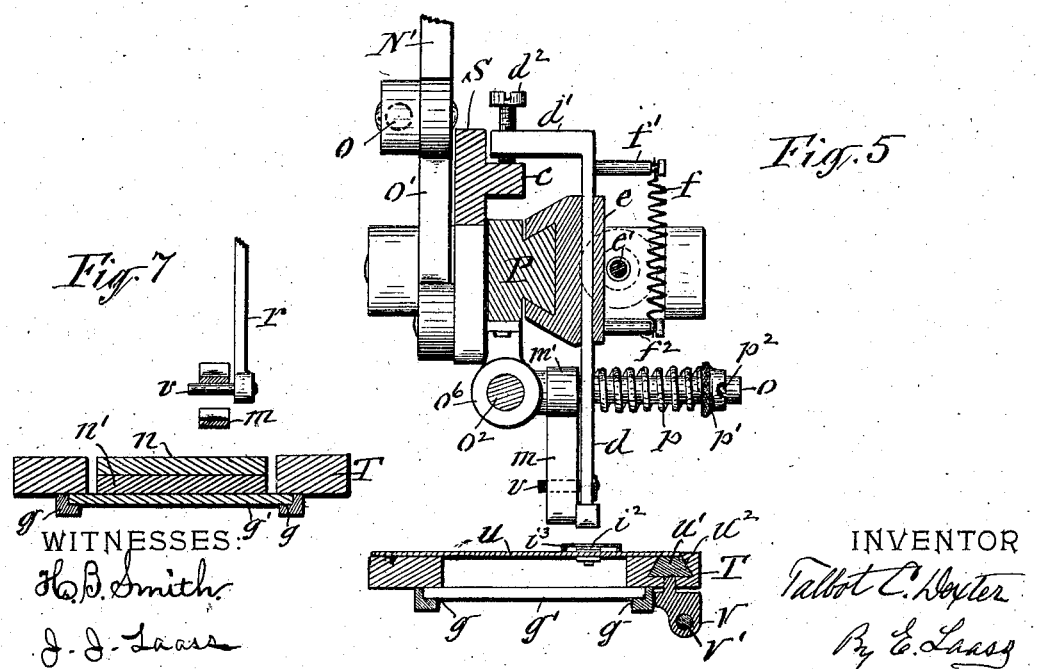

In the annexed drawings, Figure 1 is a plan view of a paper-folding machine provided with my improved paper-registering instruments. Figs. 2 and 3 are enlarged longitudinal sections respectively on lines $U^\times U^\times$ and $V^\times V^\times$ in Fig. 1, showing the registering instrument in different steps of its operation. Fig. 4 is a horizontal longitudinal section on line X X in Fig. 2. Fig. 5 is a vertical transverse section on line Y Y in Fig. 2. Fig. 6 is a side view showing my improved paper-shifter in connection with a registering-point arranged above the plane of the paper to be registered, and Fig. 7 is a transverse section on line Z Z in Fig. 2.

Similar letters of reference indicate corresponding parts.

Referring to Fig. 1 of the drawings, A represents the supporting-frame of a paper-folding machine.

B B denote the folding-rollers, into the bite of which the paper to be folded is introduced by means of the usual vertically-movable blade. (Not shown.)

C is the usual feed-roller, from which the paper is delivered into the machine by the endless tapes $a\ a$.

D D are the drop-rollers, which press the paper onto the feed-roller to permit the latter to obtain the necessary hold on the paper to be fed.

W represents the front stop or gage, which arrests the delivered paper preparatory to being registered and folded, and $a'\ a'$ are longitudinal bars which guide the paper to the gage W, which is moved to and from its paper-arresting position at properly-timed periods by means of rotary cams $j$ and springs $j'$, imparting oscillatory motion to levers $j'$, which are hung loosely on the shaft $k'$ or otherwise suitably supported, and are connected to shoes $j^3$, in which are journaled rods $j^4$, extending to the gage W, where said rods are screw-threaded and pass through nuts $j^5$, attached to the gage. The opposite end of each of said rods has fastened to it a worm-gear $j^6$, which meshes with a worm-gear $j^7$, fastened to a shaft $j^8$, journaled in arms formed on the shoes $j^3$. The shaft $j^8$ is provided with suitable means for turning it by hand. By turning this shaft the screw-rods $j^4$, working in the nuts $j^5$, adjust the gage W for paper of different dimensions.

For registering the paper longitudinally it requires two registering instruments located at opposite sides of and equidistant from the longitudinal central line of the delivery of the paper to the machine, as shown in Fig. 1 of the drawings. Each of these instruments consists of a bracket F, supported on a transverse bar G, which is rigidly mounted on suitable supports H, secured to the top of the sides of the frame A. Said brackets are adjustable lengthwise on their supporting-bar G to allow the registering instrument to be adjusted in said direction, so as to conform to the location of the slits or openings in the paper to be registered. The adjustment of the brackets is effected by means of screws $b$, passing through correspondingly-screw-threaded eyes extending transversely through the brackets. The outer ends of said screws are journaled in similar brackets F', rigidly secured to the ends of the bar G and are usually provided with hand-wheels $b'$, by which to turn said screws. The forward ends of the brackets F and F' (which ends are beyond the supporting-bar G) are formed with eyes extending transversely through them and having journaled in them a rock-shaft I, to one end of which is fastened an arm J, the free end of which has pivoted to it a roller J', by which it bears on a cam K, attached to a rotary shaft K', which is mounted in suitable bearings on the sides of the frame A and receives motion from the driving mechanism of the folding-machine by means of a suitable train of gears, as indicated at L in Fig. 1 of the drawings, or by any other suitable power-transmitting mechanism as may be found most convenient and efficient in its connection with the aforesaid driving mechanisms.

To the shaft I at each of the brackets F is attached an upwardly-extending arm M, the free end of which is adjustably connected by a rod N to the upwardly-extending arm of a bell-crank lever N', pivoted to the rear end of the bracket F. This arm of the lever N' is connected by a rod O to a correspondingly-disposed arm of a bell-crank lever O', which is pivoted to a bar P, fixed at one end to the bracket F and extending toward the folding-rollers B, where it rides loosely on a bar R, extending across the folding-machine and fastened to supports R', secured to the frame A.

The part of the instrument thus far described is similar to that shown in my prior application for Letters Patent, Serial No. 734,623, filed October 24, 1899.

The longitudinally-extending arms of the two bell-crank levers N' and O' are of equal lengths, and to the free ends of said arms is pivotally connected a horizontal bar S, which receives vertical movement by the rocking of said levers and is maintained in horizontal position during said movement owing to the connections of said bar being equidistant from the pivots of the levers. The bar S has on its side a horizontal rib $c$, from which is suspended a vertical plate $d$, having a lug $d'$ projecting from its side and riding on the rib $c$, preferably by means of an adjustable screw $d^2$, passing through the lug $d'$ and bearing on the rib $c$, as more clearly shown in Fig. 5 of the drawings, said screw allowing the plate $d$ to be adjusted so as to carry its free or lower end a greater or less distance beneath the bar S, for the purpose hereinafter explained.

The plate $d$ may be made either to merely depress the paper in proximity to a registering-point located normally beneath the plane of the paper, as represented in Figs. 2 and 3 of the drawings, or to carry the registering-point over the paper and depress the paper adjacent to a bridge $q$, which opens the slit in the paper to facilitate the entrance of said registering-point into said slit, as illustrated in Fig. 6 of the drawings. In either case said plate $d$ is sustained in vertical position by means of a guide $e$, mounted longitudinally adjustable on the bar P and receiving the plate $d$ through it. The guide $e$ is adjustably sustained in its position by means of a horizontal screw $e'$, journaled in an ear $e^2$ on the bar P and passing through a screw-threaded ear $e^3$ on the guide $e$. A spiral spring $f$, connected at opposite ends to studs $f'$ and $f^2$, projecting, respectively, from the upper end of the plate $d$ and from the guide $e$, serves to impart downward pressure to the plate $d$ and cause said plate to descend synchronously with the bar S.

Beneath the bar P and parallel therewith is a bar T, which rests with one end loosely upon a transverse bar T', located adjacent to the folding-rollers B and firmly secured to suitable supports on the sides of the frame A. The opposite end of the bar T is rigidly secured to the bracket F by means of a strut $T^2$. Said bar is thus maintained in the same position in relation to the bracket during the lateral adjustment of said bracket. The bar T is formed with longitudinal ways $g\ g$, in which slides a plate $g'$, which receives properly-timed intermittent reciprocating motion from a rock-arm $k$, which is fastened at one end to a shaft $k'$, mounted in the free end of an arm $k^2$, rigidly attached to or integral with the bracket F. The opposite end of the rock-arm $k$ is suitably connected by a rod $l$ to the plate $g'$. The shaft $k'$ derives rocking motion from a lever $l'$, attached at one end to said shaft and provided on its free end with a roller by which it bears on a cam $l^2$, attached to the shaft $k'$. Under the vertical plate $d$, hereinbefore described, is another horizontal plate U, lying upon the bar T and sufficiently remote from the plate $g'$ to avoid interference with the longitudinal movement of the latter plate. The plate U is attached to a longitudinal slide U', sustained in a groove $U^2$, formed in the bar T. To this slide is attached a nut V, through which passes a screw V', extending lengthwise of the bar T and journaled in an ear $h$, attached to said bar. The end of said screw has affixed to it a knurled thumb-piece $h'$, convenient of access for manipulation.

In case the registering-point is attached to the vertical plate $d$, as shown at $i$ in Fig. 6 of the drawings, the slit-opening bridge $q$ is attached to the plate U; but when it is desired to operate the registering-point from beneath the paper to be registered, as shown at $i^2$ in Figs. 2 and 3 of the drawings, said registering-point is attached to the plate U and projects above the same sufficiently to allow it to enter or engage the slit or opening in the paper. This registering-point protrudes through a slit in a vertically-yielding paper-supporting plate or spring-plate $i^3$, which is attached at one end to the plate U and has its main portion normally even or nearly even with the plane of the registering-point $i^2$ and its opposite end presented toward the folding-rollers B and bent downward to allow the advance edge of the paper to freely slide upon said spring-plate and over the registering-point during the process of feeding the paper into the machine. By turning the screw V', hereinbefore described, the plates U and $i^3$, together with the registering-point $i^2$, are shifted back or forth, as may be required to adjust said registering-point for operating on paper having the slit in different positions.

The registering of the paper is effected during a secondary advance movement of the paper after it has been advanced to and arrested by the gage W.

One of the salient features of my present invention resides in the devices for imparting the aforesaid secondary advance movement to the paper, and it consists of the vertically-yielding paper-shifting finger $m$, which is disposed with its free end or paper-engaging portion directly over a paper-conveying bed or plate $n$, secured to the top of the reciprocating plate $g'$ or to an interposed plate $n'$, adjustably mounted on the plate $g'$, as shown in Figs. 2 and 7 of the drawings. The finger $m$ may be formed of two strips of spring metal disposed one lengthwise over the other and extending from a tubular hub $m'$, which may be integral with said metal strips. The hub $m'$ is mounted on a stud $o$, which projects laterally from a sleeve $o'$, embracing and suitably clamped on a rod $o^2$, disposed parallel with the bar T and secured to the reciprocating plate $g'$, preferably through the medium of a post $o^3$, fastened to said plate and formed with a longitudinal sleeve $o^4$, through which the end of the rod $o^2$ passes and in which it is adjustably clamped by a set-screw $o^5$. The opposite end of said rod is preferably supported in an eye $o^6$, projecting from the stationary bar P. The said paper-shifting finger $m$ extends from the hub $m'$ toward the gage W and is curved longitudinally to deflect its central portion downward. A spiral spring $p$ embraces the stud $o$ and is connected at one end to the hub $m'$ and at the opposite end to a collar $p'$, which is mounted loosely on the stud and is provided in its face with a transverse notch engaging a pin $p^2$, projecting from the stud, as shown in Fig. 5 of the drawings. By pushing the collar $p'$ inward on the stud sufficiently to release it from the pin $p^2$ and then turning the collar and subsequently allowing it to reëngage the pin the tension of the spring $p$ can be increased or diminished to impart greater or less downward pressure to the finger $m$, and thus regulate the pressure of said finger upon the paper lying upon the conveying bed or plate $n$. The hub $m'$ of the paper-shifting finger $m$, being carried on the sleeve $o'$, clamped on the rod $o^2$, which moves with the reciprocating plate $g'$, causes said finger to partake of a corresponding motion from said plate, and to thus travel back and forth with the subjacent paper-conveying bed $n$. To lift the finger from said bed during the rearward travel thereof, a hanger $r$ is connected to the vertically-movable bar S by a lug $r'$, projecting laterally from said hanger and riding on the rib $c$ on said bar. This hanger is sustained vertically and adjustably lengthwise of the bar S by means of a vertical guide $s$, which is mounted longitudinally adjustable on the stationary bar P and sustained in its adjusted position by means of a screw $t$, journaled in a bearing $u'$ on a plate $u$, secured to the bar P. One end of said screw passes through a nut $t'$, fastened to the guide $s$, and the opposite end of said screw is provided with a suitable knob $t^2$ by which to turn it. By turning the said screw the guide $s$ is shifted lengthwise on the bar P, as may be desired. A suitable spring $r^2$, connected at opposite ends to the hanger $r$ and to the guide $s$, serves to maintain the hanger on its bearing on the rib $c$. The lower end of the hanger has projecting laterally from it a pin $v$, which passes under the upper metal strip of the paper-shifting finger $m$.

The operation of the described registering instrument is as follows: The paper is delivered over the folding-rollers B B by the conveying-tapes $a$ $a$. In the meantime the paper-depressor $d$ and the paper-shifting finger $m$ are in elevated position, and the gage W is in its rearmost or nearest position to the folding-rollers to temporarily arrest the advance movement of the paper. As soon as the paper has thus been brought to rest the gage W moves forward to release the paper, and the depressor $d$ and finger $m$ descend and bear on the underlying paper, and then said finger and plate $g'$, with the plate $n$ secured thereto, move forward, and thereby shift the paper longitudinally and impart to it the necessary secondary advance movement to carry the slitted portion of the paper into engagement with the registering-point, which arrests said secondary movement of the paper and leaves said paper in its requsite registered or alined position in relation to the folding-rollers.

It will be observed that by my present invention I effect the secondary advance movement of the paper by simple and efficient paper-shifting devices, which are adjustable to obtain the desired hold upon the paper to shift the same to its registering position and which shifting devices move in a uniform horizontal plane, and thus maintain the paper free from disturbances from its plane during said operation. It will also be noted that in my said invention the paper-shifting devices are moved to and from their operative position independently of the mechanisms which move the gage to and from its paper-arresting position, and therefore their times of action can be adjusted to move in any desired order, which latter is accomplished by the adjustment of the same K, $l^2$, and $j$, and it will be furthermore observed that the described paper-shifting finger $m$ is capable of operating with equal efficiency in connection with a registering-point which may be arranged to operate from either above or beneath the paper to be registered.

What I claim as my invention is—

1. In combination with a registering-point disposed to engage a slit or perforation in the paper, a paper-conducting bed, a paper-shifting finger disposed over said bed, mechanism imparting horizontal reciprocating motion to said finger, and means for pressing said finger onto the underlying paper during the horizontal travel of the finger in one direction.

2. In combination with a registering-point disposed to engage a slit or perforation in the paper, a paper-conducting bed, a paper-depressor in proximity to the registering point, a paper-shifting finger disposed over said bed, and mechanism imparting reciprocating motion to said finger to move the paper to registering position.

3. In combination with a registering-point disposed to engage a slit in the paper, a paper-conducting bed, a paper-depressor in proximity to the registering-point, a rod parallel with said bed, mechanism imparting reciprocating motion to said rod, a paper-shifting finger connected to and moving with said rod, and means for depressing said finger during its movement in one direction and thereby shift the paper to registering position.

4. In combination with a registering-point disposed to engage a slit in the paper, a paper-conducting bed, a vertically-movable paper-depressor in proximity to the registering-point, a vertically-movable finger over the bed, and mechanisms imparting horizontal motion to said finger during the depressed positions of the aforesaid depressor and finger.

5. In combination with a paper-supporting plate, a registering-point located in the plane of said plate and in position to engage a slit or perforation in the paper, a paper-shifting device movable to bear upon the paper, and mechanism imparting horizontal motion to said shifting device to convey the paper to registering position as set forth.

6. In combination with a paper-conducting bed, a registering-point located to engage a slit in the paper from underneath the sheet, a paper-depressor in proximity to said point, a vertically-yielding paper-shifting finger over the aforesaid bed, means for depressing said finger onto said bed, and mechanism imparting horizontal motion to the depressed finger as set forth.

7. The combination of a paper-supporting plate, a registering-point protruding from said plate, a paper-depressor in proximity to said registering-point, a paper-conveying bed, a vertically-yielding and horizontally-movable paper-shifting finger over said bed, means for periodically depressing said finger and mechanism imparting horizontal movement to the depressed finger as set forth.

8. The combination of a vertically-yielding paper-supporting plate, a registering-point normally in the plane of said plate, a vertically-movable paper-depressor depressing the aforesaid plate from the registering-point, a paper-conveying bed, a vertically-yielding and horizontally-movable paper-shifting finger over said bed, means for depressing said depressor and finger, and mechanism imparting horizontal movement to the depressed finger as set forth.

9. The combination of a vertically-yielding paper-supporting plate, a registering-point normally in the plane of said plate, a paper-conveying bed, a vertically-yielding and horizontally-movable paper-shifting finger over said bed, a vertically-movable bar maintained in horizontal position, a paper-depressor carried on said bar and disposed to depress the aforesaid paper-supporting plate, a hanger connecting the free end of the paper-shifting finger to the aforesaid bar, mechanism transmitting vertical movement to said bar, and mechanism imparting motion to the paper-shifting finger as set forth.

10. The combination of paper-delivering tapes, an alternately advancing and receding paper-arresting gage, a registering-point disposed to engage a slit or perforation in the delivered paper, a paper-conducting bed, a paper-depressor in proximity to the registering-point, a paper-shifting finger over said bed and mechanism imparting reciprocating motion to said finger to move the paper to registering position as set forth.

11. The combination of paper-delivering tapes, an alternately advancing and receding paper-arresting gage, a vertically-yielding paper-supporting plate, a registering-point protruding through said plate, mechanism depressing said plate beneath the plane of the registering-point and means for imparting a secondary advance movement to the paper independently of the aforesaid tapes as set forth.

12. The combination of paper-delivering tapes, an alternately advancing and receding paper-arresting gage, a vertically-yielding paper-supporting plate, a registering-point protruding through said plate, a vertically-movable bar maintained in horizontal position, a paper-depressor connected to said bar in position to depress the aforesaid vertically-yielding plate, a vertically-yielding and longitudinally-movable paper-shifting finger arranged between the registering-point and aforesaid gage, a hanger connecting the free end of said finger to the aforesaid vertically-movable bar, mechanism transmitting the vertical movement to said bar, and mechanism imparting reciprocating motion to the aforesaid finger as set forth.

13. In combination with the paper-delivering tapes, and a paper-registering point disposed to engage a slit or opening in the paper, a longitudinally-movable horizontal plate, a rod parallel with said plate and secured thereto, a paper-shifting finger connected to said rod, mechanism imparting reciprocating motion to the aforesaid plate, and mechanism lifting the free end of said finger during the rearward movement of the plate as set forth.

14. In combination with the paper-delivering tapes, an alternately advancing and receding gage, a paper-registering point disposed to engage a slit or opening in the paper, and a longitudinally-movable horizontal plate, a rod disposed parallel with and secured to said plate, a paper-shifting finger mounted on said rod, a spring depressing the free end of said finger, mechanism imparting reciprocating motion to the aforesaid plate, mechanism periodically lifting the free end of the aforesaid finger and mechanism transmitting motion to the gage as set forth.

15. In combination with the paper-delivering tapes, an alternately advancing and receding gage, a vertically-yielding paper-supporting plate, a registering-point protruding in said plate from underneath, a vertically-movable bar maintained in horizontal position, a paper-depressor connected to said bar in position to depress the aforesaid plate, a longitudinally-movable horizontal plate, a rod disposed parallel with said plate and fastened thereto, a paper-shifting finger mounted on said rod, a hanger connecting the free end of the aforesaid finger to the aforesaid vertically-movable bar, mechanism actuating said bar, mechanism imparting reciprocating motion to the aforesaid longitudinally-movable plate, and mechanisms actuating the gage as set forth.

16. The combination with the paper-delivering tapes, an alternately advancing and receding paper-arresting gage and a paper-registering point disposed to engage a slit or opening in the paper in transit, a paper-shifting finger movable parallel with the plane of the delivery of the paper, and separate mechanisms imparting the aforesaid movements respectively to the gage and to the paper-shifting finger.

17. In combination with the paper-delivering tapes, an alternately advancing and receding paper-arresting gage, a vertically-yielding paper-supporting plate, a registering-point protruding in said plate from underneath, means for adjusting said plate, and point for different locations of the slit or opening in the paper to be registered, a vertically-movable bar maintained in horizontal position, a paper-depressor connected to said bar and adjustable to depress the paper-supporting plate in proximity to the registering-point, an intermittently-reciprocating horizontal plate, a rod disposed parallel with said plate and sustained longitudinally adjustable thereon, a sleeve secured to said rod and provided with a laterally-projecting stud, a hub mounted on said stud, a spiral spring surrounding the stud and connected at one end to the hub, and the opposite end to a collar which is mounted adjustably on the stud, a paper-shifting finger attached to said hub, a hanger connecting the free end of said finger to the aforesaid vertically-movable bar and adjustable longitudinally on said bar, and mechanism imparting reciprocating motion to the aforesaid longitudinally-movable plate, and separate mechanisms transmitting motion to the paper-arresting gage as set forth and shown.

TALBOT C. DEXTER. [L. S.]

Witnesses:
G. V. B. LEITCH,
M. E. MORRISON.